US005422158A

United States Patent [19]

Cheng

[11] Patent Number: 5,422,158

[45] Date of Patent: Jun. 6, 1995

[54] PUZZLE PAPER-BLOCK STRUCTURE

[76] Inventor: Shue-Yuan Cheng, P.O. Box 96-405, Taipei 10098, Taiwan, Prov. of China

[21] Appl. No.: 179,529

[22] Filed: Jan. 10, 1994

[51] Int. Cl.[6] .......... B32B 3/04

[52] U.S. Cl. .......... 428/126; 428/130; 428/542.6; 446/488

[58] Field of Search .......... 428/125, 126, 130, 542.2, 428/542.6; 446/488

*Primary Examiner*—Alexander S. Thomas

*Attorney, Agent, or Firm*—Bacon & Thomas

[57] ABSTRACT

A puzzle paper-block structure, which is made of a piece of paper having a given folding strength; the paper is folded symmetrically along a horizontal folding line, and then is folded further along a vertical folding line to form two sides (left and right sides); a symmetrical oblique folding line is used as a reference line to fold the left and right sides towards the vertical folding line; each side of the paper folded is folded into two fold sides (an inner and outer fold sides) along the oblique folding line; the inner and outer fold sides are folded together to form into an outer wing side; then, the outer end of the paper is folded along an inner-wing oblique folding line to have an outer fold side bent towards the inner triangle side to form into a symmetrical inner wing side. The inner wing side is then folded along the reference folding line to the outer wing side; then, the two outer wing sides are folded, along the vertical folding line, together to form into a triangle block unit; such a triangle block unit has a buffer area between the reference folding line of the two fold sides. After the triangle block unit is folded into form, the outer end angle becomes an inserting lug, and the inner and outer fold sides form into a lug hole. A plurality of block units can be assembled together by means of longitudinal and lateral connection to make various forms desired.

4 Claims, 7 Drawing Sheets

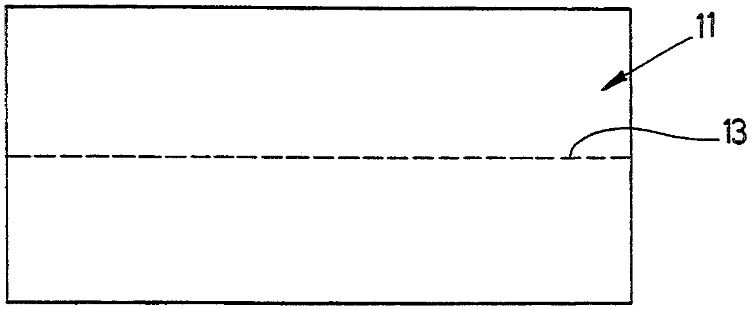
FIG. 1-A
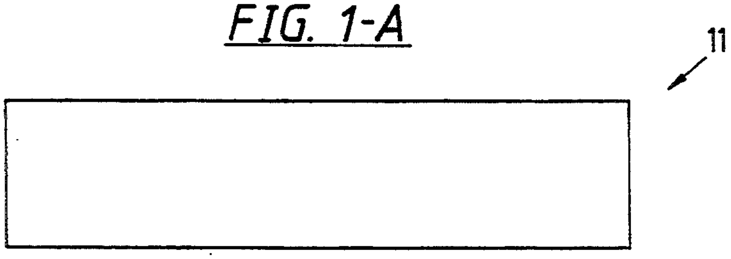
FIG. 1-B
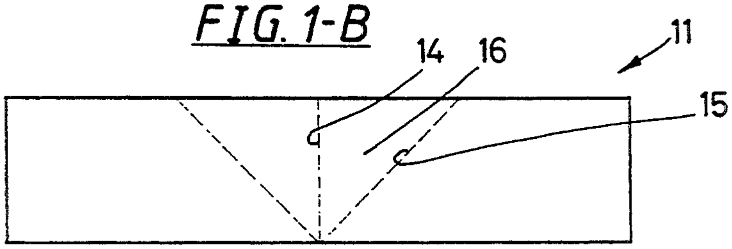
FIG. 1-C
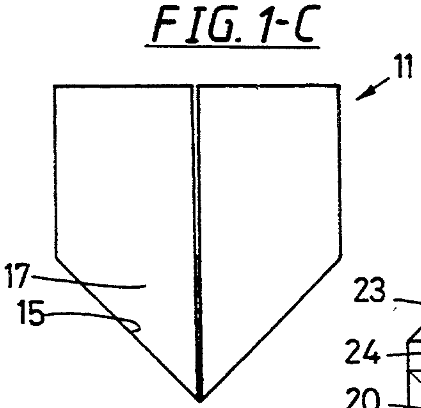
FIG. 1-D
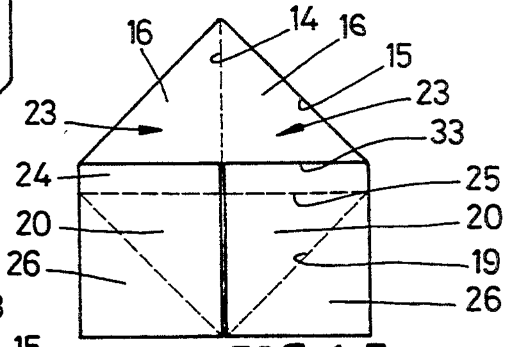
FIG. 1-E
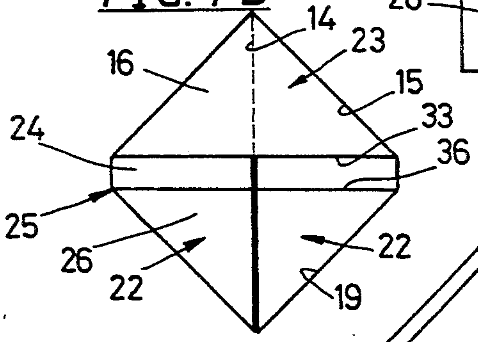
FIG. 1-F
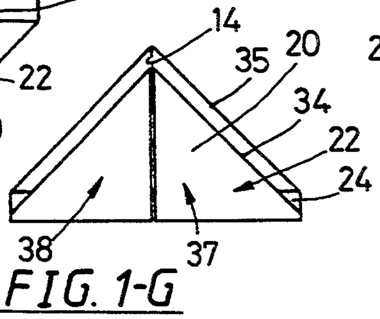
FIG. 1-G
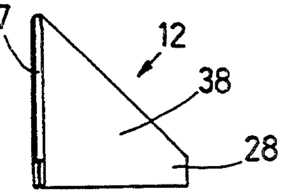
FIG. 1-H

PUZZLE PAPER-BLOCK STRUCTURE

BACKGROUND OF THE INVENTION

1. Field of the Invention

This invention relates to a paper block unit, and particularly to a triangular block unit made of a piece of paper having a given folding strength. A plurality of such block units can be assembled into various puzzle forms through a longitudinal and lateral connection.

2. Description of the Prior Art

Most of the conventional puzzle blocks are made of plastics molded into form; the block units comprise various forms of basic units, of which each has a short stud at one end thereof, while the other end or a suitable part of the basic unit has a female groove to be mated with a short stud. The basic units can be assembled into various forms by means of the short stud and the female groove on each basic unit. Such connection method is chiefly used in a puzzle toy, of which the basic units are made of plastics molded into form so as to assemble into different designed forms; however, the manufacturing cost of such basic units is high.

In a conventional jigsaw puzzle, the basic units are made of a cardboard, being cut into various forms designed in advance; such basic units can be assembled into a rectangle form by connecting the corresponding edges of the basic units; such jigsaw puzzle is usually limited by its design, and it can only be assembled into a flat form.

SUMMARY OF THE INVENTION

The prime object of the present invention is to provide a triangle block unit, which is made of a piece of paper having a given folding strength; the paper is folded symmetrically along a horizontal folding line, and then is folded further along a vertical folding line to form two sides (left and right sides); a symmetrical oblique folding line is used as a reference line to fold the left and right sides towards the vertical folding line; each side of the paper folded is folded into two fold sides (an inner and outer fold sides) along the oblique folding line; the inner and outer fold sides are folded together to form into an outer wing side; then, the outer end of the paper is folded along an inner-wing oblique folding line to have an outer fold side bent towards the inner triangle side to form into a symmetrical inner wing side. The inner wing side is then folded along the reference folding line to the outer wing side; then, the two outer wing sides are folded, along the vertical folding line, together to form into a triangle block unit; such a triangle block unit has a buffer area between the reference folding line of the two fold sides. After the triangle block unit is folded into form, the outer end angle becomes an inserting lug, and the inner and outer fold sides form into a lug hole. A plurality of block units can be assembled together by longitudinal and lateral connection to make various forms desired.

Another object of the present invention is to provide a triangle block unit, of which the inner wing side and the outer wing side are folded along a vertical folding line to form into two symmetrical wing plates; each wing plate provides a lug hole, while the outer end angle of the wing plate is used as an inserting lug.

Still another object of the present invention is to provide a triangle block unit, which is made of a piece of rectangle paper. The outer fold side of the block unit is folded, along an inner-wing oblique folding line, towards an inner triangle side to form into two symmetrical inner wing sides. A buffer area is defined between the reference folding line of the inner wing side and the corresponding edge of the inner fold side. The symmetrical inner wing sides are folded, along the reference folding line, towards the inner fold side. The oblique edge of the inner wing side and the oblique edge of the inner fold side are separated each other at a small space. The buffer area and the small space provide a pressure buffer space for the outer fold side of the outer wing side.

A further object of the present invention is to provide a triangle block unit, of which the two wing plates are folded together along the vertical folding line to form two lug holes and two inserting lugs respectively. A plurality of paper-block units can be assembled into various forms by means of the lug holes and the inserting lugs to be connected in different directions, series, tightness and angle.

A still further object of the present invention is to provide a triangle block unit, of which the buffer area between the inner and outer wing sides is defined from the reference folding line to the corresponding edge of the outer wing side, having a space at least two (2) mm so as to provide a buffer space for the connection between the inserting lug and the lug hole.

Another further object of the present invention is to provide a triangle block unit, of which the inner wing side is folded, along the reference folding line, towards the outer wing side, and the oblique edge of the inner wing side is set within the oblique edge of the outer wing side at a distance at least one (1) mm so as to have the edges of the two wing sides maintained in a flat and straight condition.

Yet a further object of the present invention is to provide a triangle block unit, of which the lug holes and the inserting lugs of the two wing plates are used for connecting and assembling a plurality of block units by varying the folding, the tightness or looseness between the two wing plates.

BRIEF DESCRIPTION OF THE DRAWINGS

FIGS. 1A–H is a flowchart of making a triangle block unit according to the present invention.

DETAILED DESCRIPTION OF THE PREFERRED EMBODIMENT

Figure 2:
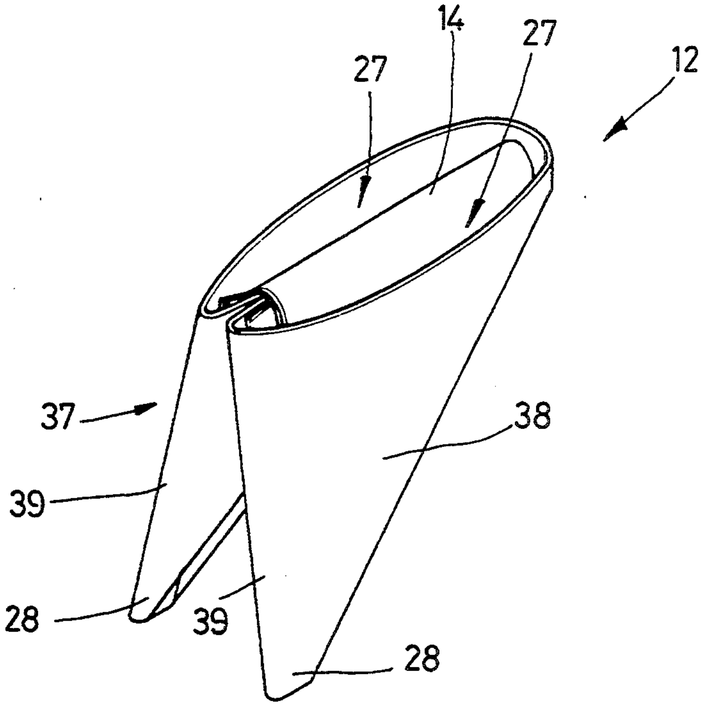
FIG. 2 is a perspective view of a single block unit according to the present invention.

This invention provides a puzzle paper-block structure; FIG. 1 illustrates a single triangle block unit 12 being folded into shape with a piece of paper. FIG. 1-A illustrates a plane view of the paper 11, which is of rectangular configuration with a given folding strength; the front side of the paper is printed with a color pattern. The paper 11 has a width of 120 to 135 mm (millimeter) and a height of 58 to 62 mm. The width of the paper is two times of the height thereof plus 4 to 12 mm. The additional size of the width is used as a buffer area upon the paper 11 being folded into a triangle block unit 12 so as to provide a lug hole 27 to mate with an inserting lug 28.

Before folding the paper 11 as shown in FIG. 1-A, the side with a printed pattern is facing down first; then, the upper half and the lower half of the paper are folded together along a central horizontal folding line 13 as shown in FIG. 1-B. In FIG. 1-C, the left half and the right half of the paper are folded together along a central vertical folding line 14, and then the left and right halves are pulled to their previous position respectively. As shown in FIG. 1-D, the paper 11 is further folded along two oblique folding lines 15 at an angle of 45 degree on both sides of a vertical folding line 14 as a separation line as shown in FIG. 1-C. As shown in FIG. 1-E, the paper 11 in FIG. 1-D is turned over and reversely at an angle of 180 degree, i.e., the point end of the paper is facing up; the vertical folding line 14 divides the point end into two inner fold sides 16 symmetrically; the back sides of the inner fold sides 16 are two symmetrical outer fold sides 17. The two outer fold sides 17 and the two inner fold sides 16 are collectively formed into two outer wing sides 23, being separated with the vertical folding line 14. The lower part of the paper 11 has two symmetrical inner-wing oblique folding lines 19; each of the inner-wing oblique folding lines 19 is also the outer fold side 26 of a triangle side, the latter being an outer triangle side which faces an inner triangle side 20. The outer fold sides 26 are folded, along the inner-wing oblique folding line 19, into a form as shown in FIG. 1-F. The fold edge 36 of the outer fold side 26 is opposite to a reference folding line 25 of the inner triangle side 20. The outer triangle side 26 is folded to become opposite to the inner triangle side 20; then, sides 20 and 26 collectively form an inner wing side 22. Between the corresponding edge 33 of the inner fold side 16 and the reference folding line 25, a suitable space is provided as a buffer area 24, which is used as the connection buffer space between two triangle block units 12. The reference folding line 25 is used as a reference line to fold the symmetrical inner wing sides 22 onto the two outer wing sides 23 respectively. As shown in FIG. 1-G, a given distance of at least one mm is set between the oblique edge 34 of the inner wing side 22 and the oblique edge 35 of the outer wing side 23 for the purpose of maintaining the oblique edge 35 in a straight and flat form. When the two inner wing sides 22 are folded on to the two outer wing sides 23, two wing plates 37 and 38 are formed and separated with the vertical folding line 14. FIG. 1-H illustrates the wing plate 38 being folded onto the wing plate 37 along the vertical folding line 14 as shown in FIG. I-G, and then a triangle block unit 12 is formed. The buffer area 24 of the two wing plates of the triangle block unit 12 forms into two inserting lugs 28, while both edges of the wing plates along the vertical folding line 14 form two lug holes 27.

As shown in FIG. 2, each single triangle block unit 12 has two lug holes 27 on the upper edges of the two wing plates 37 and 38 respectively; the two lug holes 27 are separated from each other by the vertical folding line 14. The lower ends of the two wing plates 37 and 38 form into two inserting lugs 28 with two opening ends respectively. In the event of using a plurality of triangle block units 12 to make an object, the two inserting lugs 28 can be used for engaging with two lug holes 27 of another triangle block unit 12. When a plurality of such block units 12 are used to assemble into an object, the method of engaging the lug holes and inserting lugs is depends upon requirement of assembling direction, the continuity, the close connection and the connection angle; the buffer area 24 between the inner and outer wing sides 22 and 23 is on the straight edge 39 of the two wing plates 37 and 38. The inner wing side 22 is folded within the edge of the outer wing side 23 slightly. The space between the inner wing side 22 and the buffer area 24 are not limited with the vertical folding line 14; instead, it depends upon the assembling requirement among the block units, i.e., the buffer area may be varied slightly, if necessary.

Figure 3:
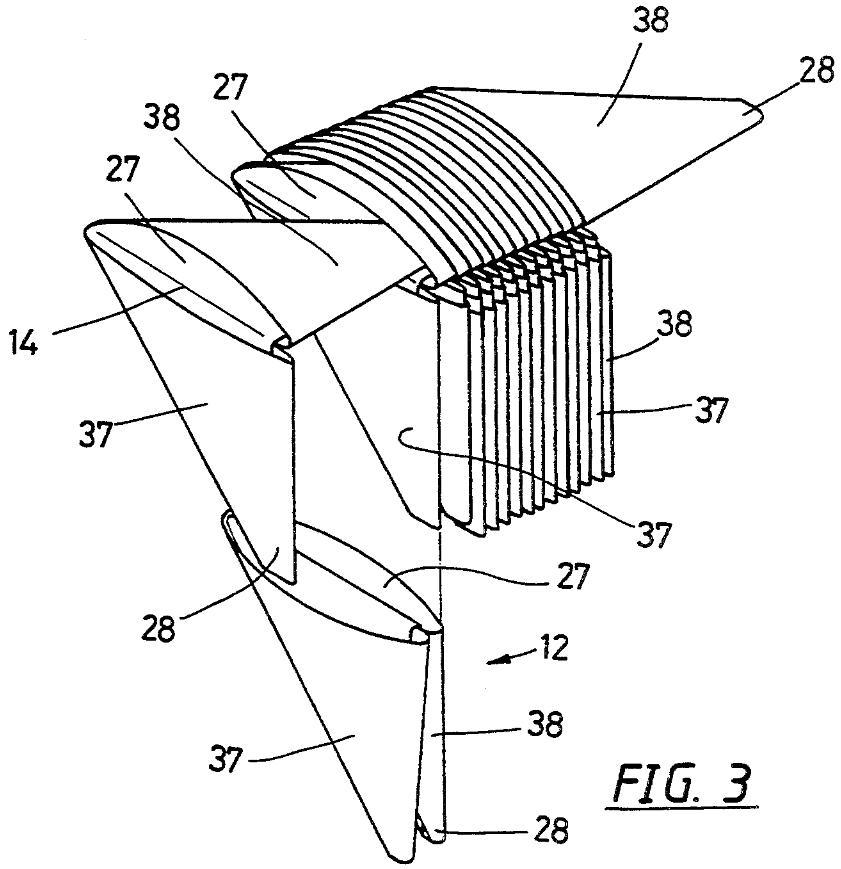
FIG. 3 illustrates a plurality of block units being assembled together in one direction by using a single lug hole.

When a plurality of the triangle block units 12 are assembled into a form as shown in FIG. 3, the lug hole 27 of a single wing plate 37 is mated with an inserting lug 28 of another block unit 12. A plurality of single wing plates 37 can be connected in series to form into a straight line, or to form into a ring after bending the straight line gradually until the last block unit is connected with the first block unit. If a plurality of single wing plates 37 are connected to one another, and both ends of such a connection are not connected to form into a ring-shaped form, both ends will be left with a lug hole 27 and an inserting lug 28; such an end can provide a connection to in another direction. The wing plates 38 can be connected one another in a straight direction with the wing plates 37 being connected perpendicularly. If several block units 12 are connected together through every two lugs holes 27 and two wing plates 38, and then such connected block units 12 are assembled in a cross-connection method; many different assembled forms can be made.

Figure 4:
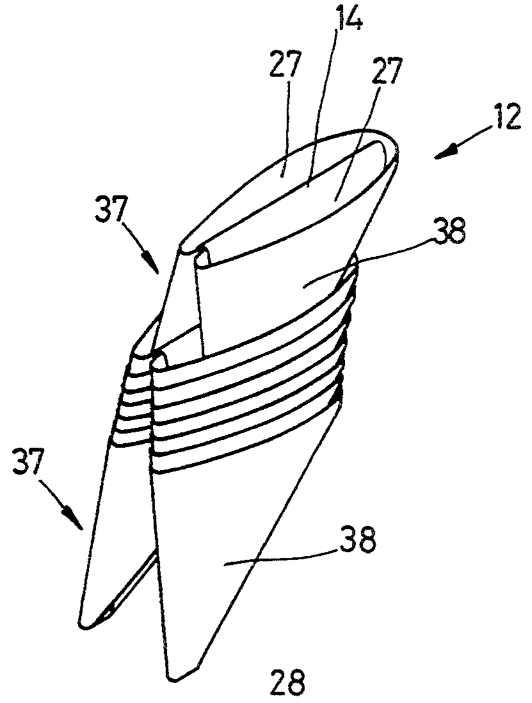
FIG. 4 illustrates a plurality of block units being assembled together in series and in one direction by using two lug holes.
Figure 7:
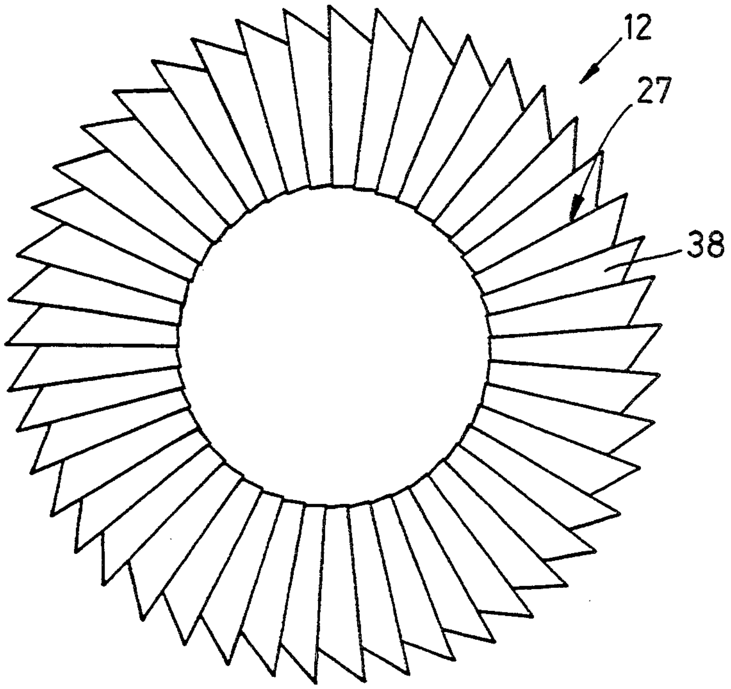
FIG. 7 illustrates a plurality of block units being assembled in one direction to form into a ring.
Figure 8:
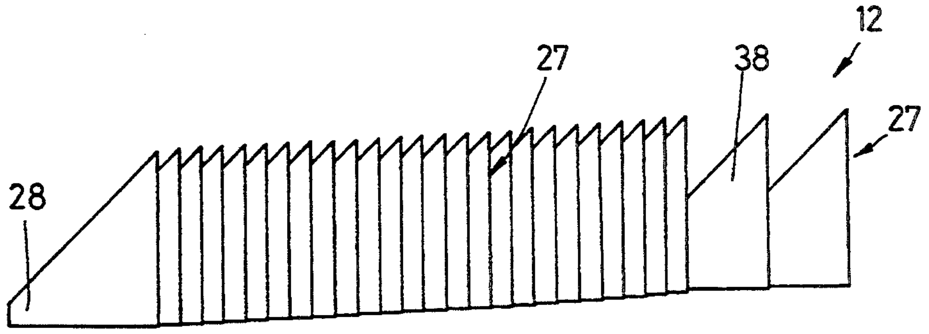
FIG. 8 illustrates a plurality of block units being assembled into a straight member.

FIG. 4 illustrates a plurality of block units 12 connected in series by using the inserting lugs 28 of the wing plates 37 and 38 to insert into the lug holes 27 respectively; such a connection method can make a ring-shaped form as shown in FIG. 7, or a straight form as shown in FIG. 8. The aforesaid ring-shaped form and the straight form can be changed into other different forms by using the lug hole 27 to extend a further connection.

Figure 6:
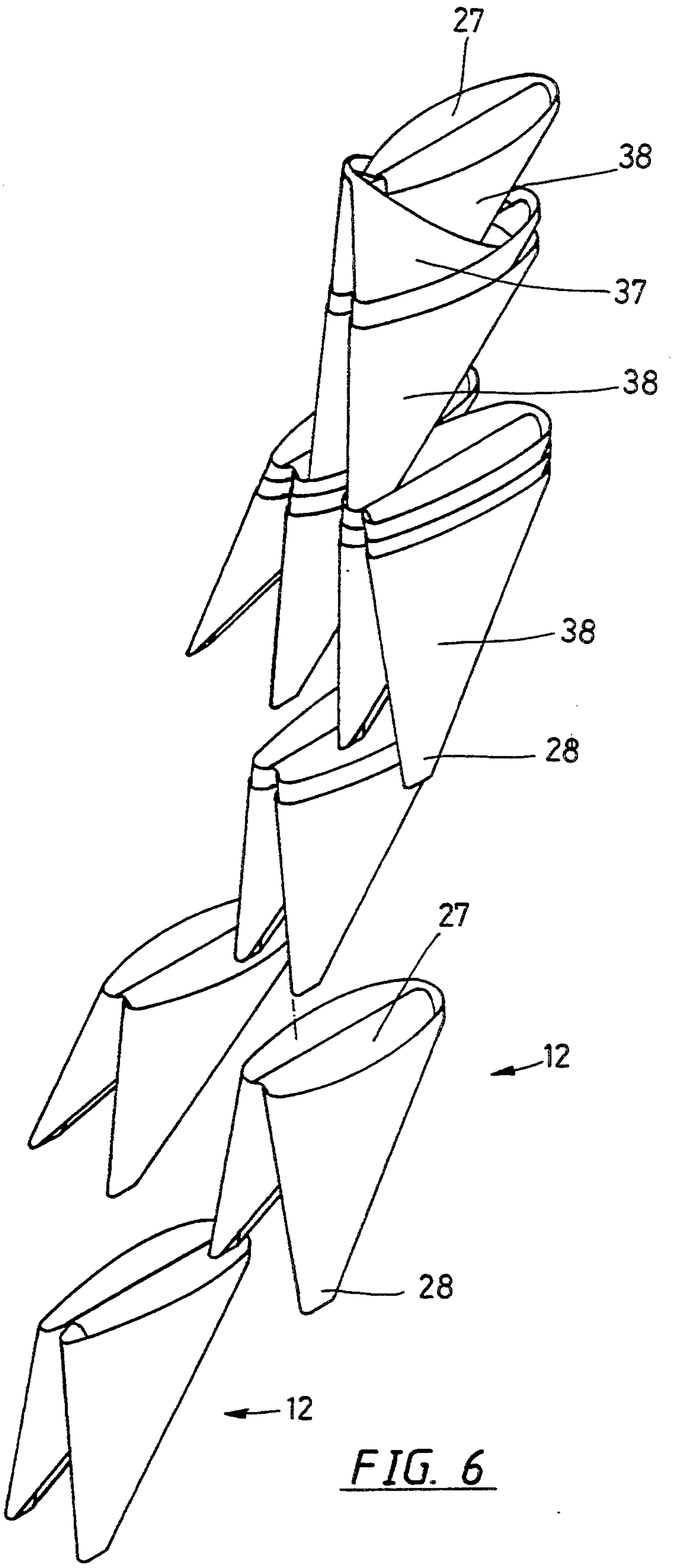
FIG. 6 illustrates a plurality of block units being assembled together in a series, in which one block is connected with two blocks repeatedly and continuously.
Figure 10:
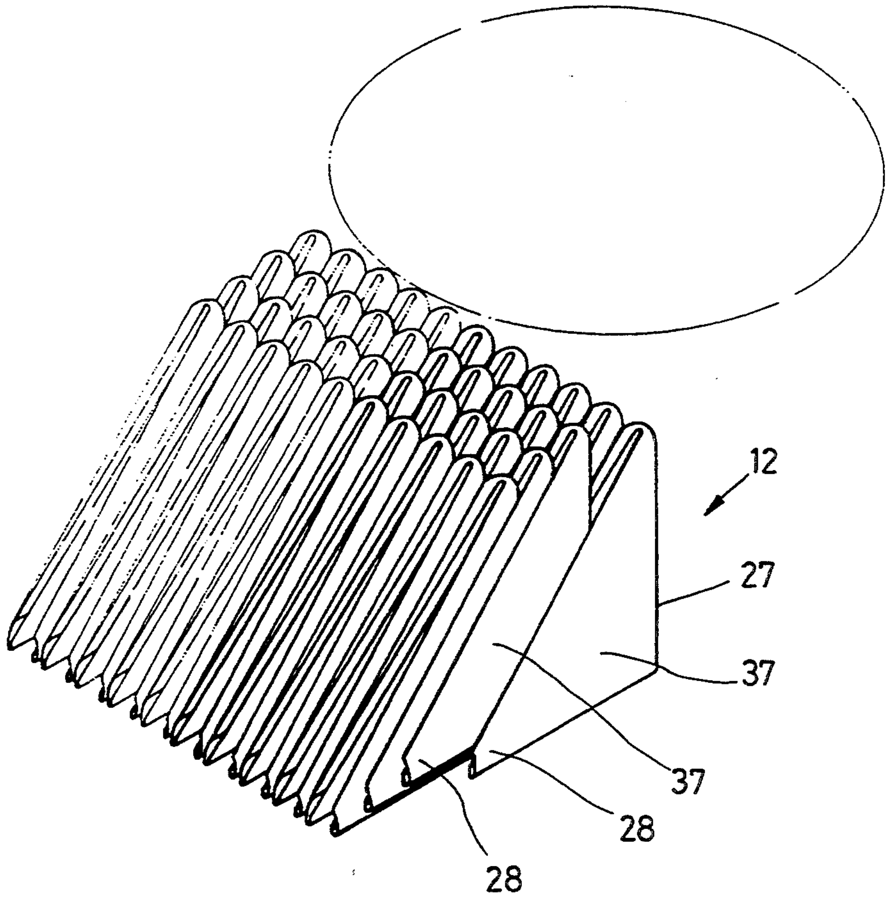
FIG. 10 illustrates a plurality of block units being assembled into a ring by using more than two block unit to be inserted in series.

A plurality of block units 12 can be connected in series as shown in FIGS. 6 and 10, in which a plurality of block units 12 are connected in series with a portion thereof being connected laterally, i.e., two lug holes 27 being inserted with the wing plates 37 and 38 of two block units 12; such connection method can produce a lateral extension form or a ring-shaped form. A preferred form can be made by changing the connection direction of the block units, and changing the tightness of connection.

Figure 5:
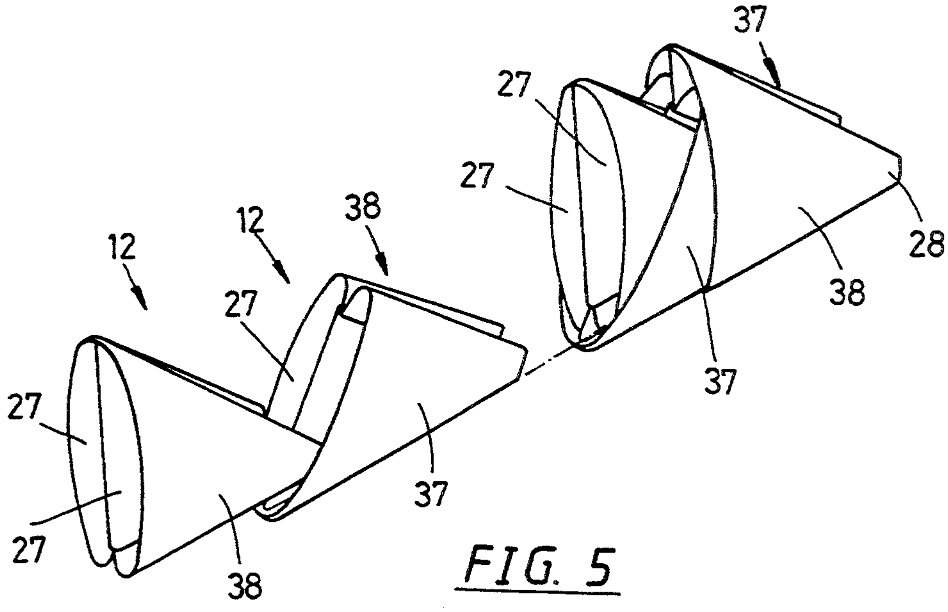
FIG. 5 illustrates a plurality of block units being assembled together by using two lug holes but by reversing the lug holes alternately.

In series connection of the block units 12 as shown in FIG. 5, the block units are connected in alternate direction, i.e., each block unit 12 being turned at an angle of 180 degree before an inserting lug 28 being inserted into a lug hole 27 of another block unit 12. When a plurality of block units are connected in series, the outer edge of each block unit 12 can be inserted with another block unite 12 so as to provide a variable assembling structure.

Figure 9:
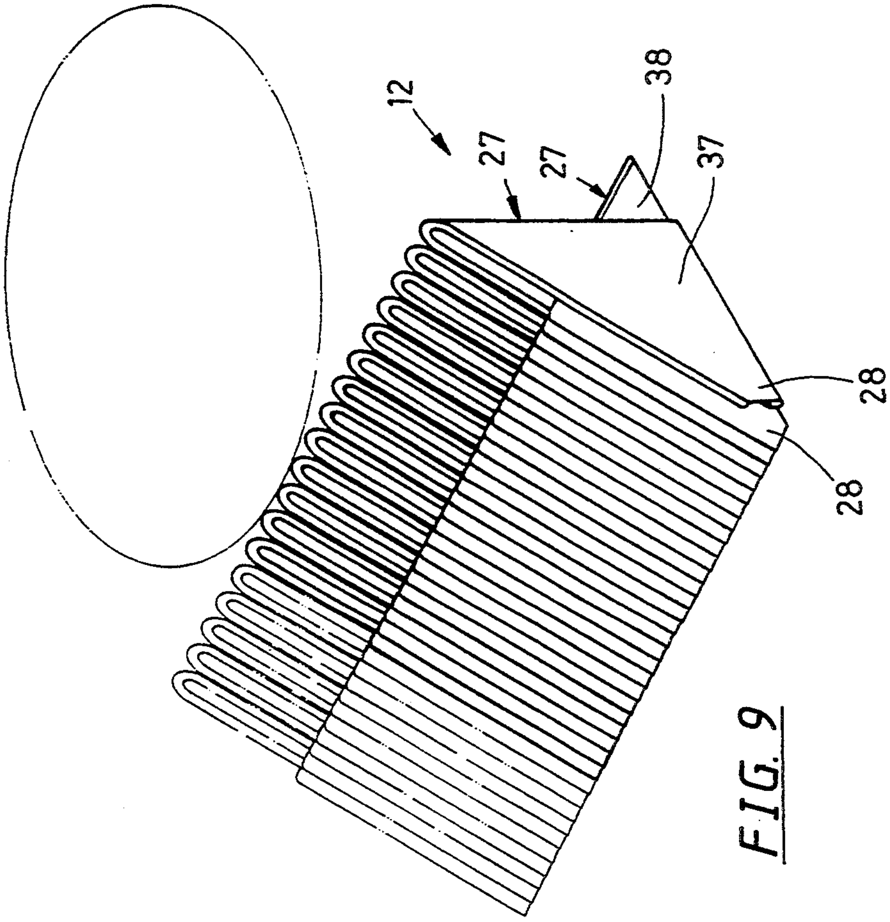
FIG. 9 illustrates a plurality of block units being assembled into a ring by using every two block units to be inserted together reversely and laterally.

As shown in FIG. 9, two block units 12 are inserted together in opposite direction, and then another two such block units 12 are connected laterally with the previous two block units, and so on; such connected block units can be assembled into a straight line or a ring-shaped form, or other forms.

The block units 12 according to the present invention are connected and assembled into a preferred form by means of the wing plates 37 and 38, the inserting plugs and the lug holes 27; different forms can be made by varying the assembling direction, the folding method between two wing plates, and the tightness or looseness. Since the clamping force of each lug hole 27 is limited, any form assembled should not be disassembled; in order to prevent the block units 12 in a form assembled from being separated unintentionally, two connected-and-assembled parts have to be glued. If a connected-and-assembled part is an accessory of a form, it can be connected with the form by inserting same therein.

According to the aforesaid description for the embodiments, it is apparent that the structure and features of the block units of the present invention are deemed practical and unique.

I claim:

1. A paper block unit for forming an assembly having a desired configuration, the block unit comprising:

a) a rectangular sheet of folding strength paper folded in half along a central horizontal folding line, a central vertical folding line dividing the folded paper into two sections, each section being folded along a first oblique folding line disposed at a 45° angle with respect to the vertical folding line to form two inner fold sides and two outer fold sides, the inner and outer fold sides collectively defining a pair of wing sides;

b) a portion of each outer fold side being folded along a second oblique folding line to define a pair of wing plates;

c) a buffer area defined by the outer folds sides, the buffer area being positioned between the pair of wing sides and the pair of wing plates, and a reference fold line extending along a pair of edges of the wing plates;

d) the wing plates being folded along the reference/bid line into overlapping engagement with the inner/bid sides, and the wing plates and wing sides being further folded inwardly along the central vertical line to form a triangular-shaped unit with the wing sides being disposed at the exterior thereof; and e) whereby the wing sides form a pair of lug holes and the buffer area forms a pair of lugs with the overlapping wing sides and wing plates so that each lug of the unit is engageable within a lug hole of an adjacent unit to form an assembly of units having a desired configuration.

2. The paper block unit of claim 1 wherein the rectangular sheet of paper has a width of approximately 120 to 135 mm, a height of approximately 58 to 62 mm and a width to height ratio of approximately 2 plus 4 to 12 mm.

3. The paper block unit of claim 1 wherein the buffer area extends from the reference folding line to a common edge of the inner folds sides, the distance between the reference folding line and the common edge being at least 2 mm.

4. The paper block unit of claim 1 wherein the wing sides each include an oblique edge and the wing plates each include an oblique edge, the oblique edges of the wing sides being spaced from the oblique edges of the wing plates a distance of at least 1 mm for maintaining the oblique edges of the wing sides in a straight and flat configuration.

* * * * *